United States Patent [19]

Resler

[11] Patent Number: 4,882,235
[45] Date of Patent: Nov. 21, 1989

[54] LIQUID CRYSTAL CELL WINDOW

[75] Inventor: Daniel P. Resler, Wilmington, Mass.

[73] Assignee: Raytheon Company, Lexington, Mass.

[21] Appl. No.: 162,922

[22] Filed: Mar. 2, 1988

[51] Int. Cl.[4] .......................... G02F 1/13; B32B 15/04
[52] U.S. Cl. .................................. 428/642; 350/334; 350/336; 428/623; 437/181; 437/184; 148/DIG. 84
[58] Field of Search .................... 350/334, 336, 339 R; 428/623, 642; 437/181, 184, DIG. 84

[56] References Cited

U.S. PATENT DOCUMENTS

| | | | |
|---|---|---|---|
| 4,008,485 | 2/1977 | Miyoshi et al. | 437/184 |
| 4,330,343 | 5/1982 | Christou et al. | 437/184 |
| 4,426,765 | 1/1984 | Shahriary et al. | 437/184 |
| 4,595,423 | 6/1986 | Miyazawa et al. | 148/DIG. 84 |
| 4,778,731 | 10/1988 | Kraatz et al. | 428/642 |

OTHER PUBLICATIONS

Bhattacharya et al., J. Appl. Phys. 54 (1983), 2329.
Andrade, I.B.M. Tech. Discl. Bull. 25 (1982), 2314.

*Primary Examiner*—Upendra Roy
*Attorney, Agent, or Firm*—C. L. Maginniss; R. M. Sharkansky

[57] ABSTRACT

An optical time delay unit for use in an optical phased array beam-steering system includes a switchable polarization rotator in conjunction with Brewster plates and mirrors to form electrically-selectable optical paths of different lengths. The switchable polarization rotator is aligned with the optical beam and is responsive to a control signal for varying the polarization of light passing therethrough. The Brewster plates receive the light passing through the first polarization rotator and are transmissive to a first polarization and reflective of a second. The transmissive and reflective paths are of different lengths, and are recombined at a second Brewster plate. The original polarization may be restored by a second polarization rotator. A plurality of time delay units may be cascaded to permit selection from among many paths of various lengths. In a preferred embodiment, the polarization rotators include liquid crystal cells having nematic phase molecules. Optically-transparent electrodes are formed on the cell windows by an ion implantation process. A planar phased array beam-forming system comprises a plurality of time delay units, illustratively arranged in a 2-by-2 configuration, wherein each unit is illuminated by a corresponding sector of a single light beam.

3 Claims, 9 Drawing Sheets

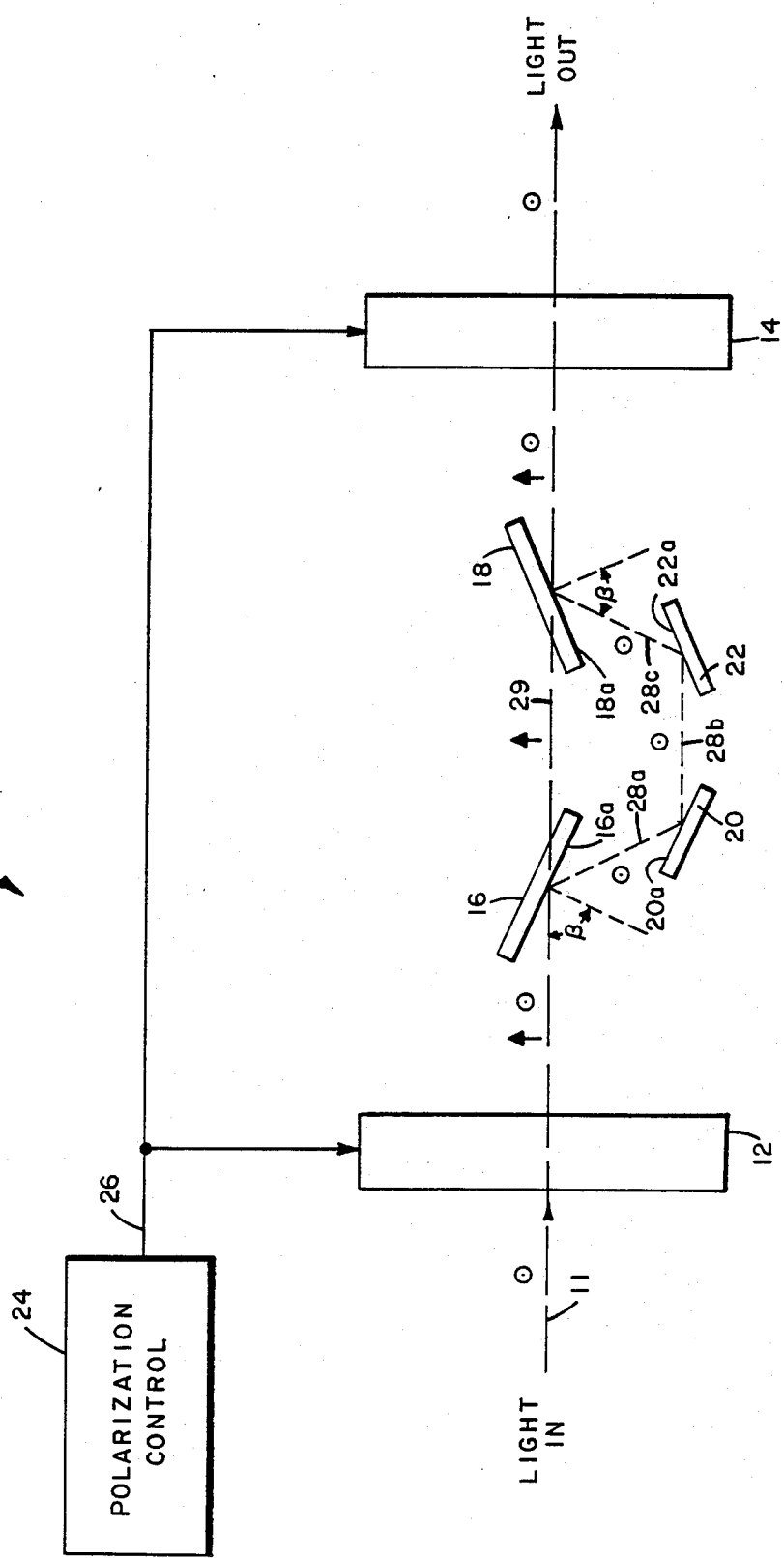

LIQUID CRYSTAL CELL WINDOW

BACKGROUND OF THE INVENTION

The present invention relates generally to optical systems and, more particularly, to an apparatus for providing selectable optical path lengths for use as an optical time delay unit in an optical phased array beamsteering system.

Microwave radar systems have been used for many years in the field of target detection for purposes of obstacle avoidance, terrain mapping and intrusion detection. More recently, radar systems at infrared wavelengths have taken advantage of the substantially shorter wavelengths of light to provide high resolution definition of target surfaces for highly accurate mappings and object identification. In order to utilize the established technology of the microwave radar systems in optical systems, it has been necessary to develop analogous subsystems.

In recent years, microwave-radar antenna systems have relied increasingly on electronic steering, employing phased arrays for rapid beam movement, in contrast to the slow movement afforded by mechanically-steered rotating antennas. Phased arrays rely for their beam directionality on varying the time delay from the source of a common signal to each radiating element of the array. The delay of each element is electronically tuned so that the wavefront radiated toward an off-boresight target simulates in phase, amplitude and direction the parallel rays which would be generated along the boresight axis. Diode phase shift networks are frequently employed in conjunction with each element to provide the necessary time delays and thereby control the radiated beam direction and pulse profile.

Presently available technologies are not sufficiently advanced to supply the need for rapid, large-angle pointing and scanning of optical beams and, in particular, of large diameter, diffraction limited carbon dioxide ($CO_2$) laser beams. In many systems, optical beam steering is currently performed using rotating optical elements. There exists a pressing need for an optical version of the versatile phased array antennas now widely used for microwave radar systems.

A fundamental element in an electrically tunable optical phase shifter is a time delay unit, by which a short burst of infrared light energy, illustratively having a duration of one nanosecond, may be delayed, illustratively by one-quarter nanosecond, so that a composite of delayed and undelayed bursts across the surface of the antenna array is a wavefront which is steered at an angle off boresight. The delay time of such a unit must be electrically selectable in order to effect beam steering.

SUMMARY OF THE INVENTION

It is therefore a primary object of the present invention to provide an optical time delay unit for use in an electrically tunable optical phase shifter.

It is a further object of this invention to provide an optical time delay unit which presents electrically selectable paths for the passage of light therethrough.

These objects and other objects of this invention are obtained generally by providing an apparatus responsive to a beam of light from a source for providing selectable delay times of the light beam between the source and utilization means. The apparatus comprises means for selectively altering the polarization of the light beam; means for providing a plurality of optical paths between the source and the utilization means, each of the plurality of paths having a different length; and means responsive to the polarization of the light beam for directing the light beam along one of the plurality of paths.

In accordance with a preferred embodiment of the present invention, the altering means includes a nematic phase liquid crystal cell which provides a net rotation of ninety degrees in the polarization of the incoming light beam when a first value of an electrical control signal is applied to the cell windows, and which provides a net rotation of zero degrees in response to a second value of the signal.

In the preferred embodiment, the directing means includes two Brewster plates obliquely positioned with respect to the light beam, the Brewster plates reflecting substantially all light of a first polarization impinging thereon, and passing substantially all light of a second polarization impinging thereon.

In the preferred embodiment, the means for providing a plurality of optical paths includes first reflecting means for providing a first optical path for light reflected by the Brewster plates, and second reflecting means for providing a second optical path for light passing through said Brewster plates; wherein one of the first and second reflecting means is fixedly mounted and the other is movably mounted such that the differential length of the two optical paths is adjustable.

Further, in accordance with the principles of the present invention, a phased array optical beamsteering system comprises source means for generating a beam of substantially collimated light of predetermined polarization; and a plurality of means for providing selectable delay times of the light beam, each of the plurality of providing means being responsive to a distinct sector of the cross-section of the light beam, the providing means recombining the selectable delayed cross-sectional sectors of the light beam into an output beam, each of the plurality of providing means comprising the apparatus according to the preferred embodiment of the present invention.

In accordance with another feature of the present invention, the windows of the liquid crystal cell comprise the cell electrodes. The cell windows are made electrically conductive while remaining optically transparent in the infrared spectrum by the use of ion implantation.

Other features and advantages of the present invention will be more fully understood from the accompanying drawings, the detailed description of the preferred embodiments, and from the appended claims.

BRIEF DESCRIPTION OF THE DRAWINGS

In the drawings:

FIG. 2 is a simplified block diagram of a first embodiment of the present invention;

DETAILED DESCRIPTION OF THE PREFERRED EMBODIMENTS

Figure 1:
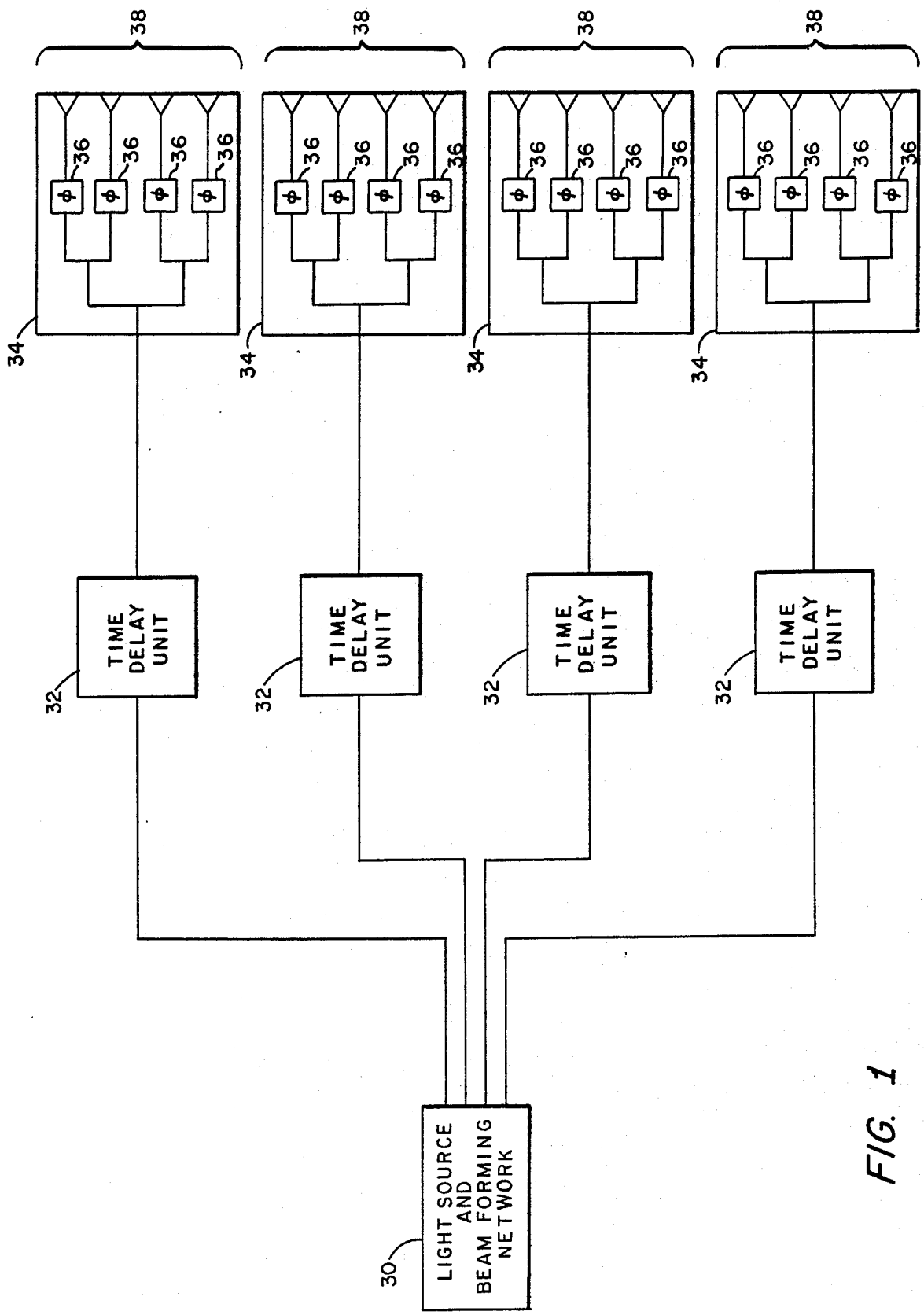
FIG. 1 is a block diagram of an optical, phased array, beamsteering system in which the present invention finds application.

Referring initially to FIG. 1, there is illustrated an optical beam steerer having a basic architecture which is analogous to a microwave phased array architecture. The optical beam steerer of FIG. 1 includes a light source and beam forming network 30 which provides a collimated light beam, typically in the infrared spectrum, having a typical wavelength in the range of 9 to 11.5 $\mu$meters ($\mu$m), illustratively at 10.6 $\mu$m. The light beam is directed toward a plurality of time delay units 32, in which the present invention resides. Time delay units 32 each provide a selectable delay of the beam received from network 30. The light passing from each time delay unit 32 is coupled to a subarray 34 comprising a plurality of phase shifters 36. Each phase shifter 36 contributes a phase shift between 0 and $2\pi$ radians so as to provide beamsteering across subapertures 38. Thus, it can be seen that the totality of subapertures 38 of subarrays 34, when driven by individual time delay units 32, may emulate a single, large-diameter aperture, for rapid steering of high-power laser radar beams.

The optical beam steerer of FIG. 1 is shown as having four time delay units 32 each feeding a subarray 34 comprising four phase shifters 36. It should be understood that these depictions are merely for the purpose of ease of comprehension. In fact, each subarray 34 may typically comprise thousands of phase shifters 36, illustratively, 2000 per linear centimeter, wherein the diameter of the subarray, illustrated as the span 38 of the subaperture, may be of the order of 30 cm (12 inches) for moderate steerings, e.g., +30°, and signal bandwidths as large as one GHz.

Referring now to FIG. 2, there is shown an optical time delay unit 10, which may be of the type shown as time delay unit 32 of FIG. 1, according to the present invention. Time delay unit 10 comprises switchable polarization rotators 12 and 14, Brewster plates 16 and 18, mirrors 20 and 22, and a circuit 24 for controlling polarization rotators 12 and 14. Control signal 26 is generated by control circuit 24 to polarization rotators 12 and 14. In a first state, signal 26 causes rotation of the polarization of light passing through both elements 12 and 14; in a second state of signal 26, the polarization of light passing through elements 12 and 14 is unaffected.

An input beam of light, represented by central ray 11, and having a polarization vector arbitrarily selected as coming out of the sheet of FIG. 2 (shown as an outward arrow), is presented to polarization rotator 12. Depending on the state of control signal 26, the light emerging from rotator 12 either has that outward polarization vector rotated (shown as an upward arrow in the plane of the figure), or the polarization vector is unaffected. Elements of a type which may be used as polarization rotators 12 and 14 are illustrated in FIGS. 3A through 3E, and are described in detail in the accompanying text.

Returning to FIG. 2, the light emerging from polarization rotator 12 is incident on Brewster plate 16, which is positioned obliquely with respect to the incoming light, typically at the Brewster angle $\beta$ for the material of plate 16. Brewster plate 16 may be fabricated of zinc selenide, for which the Brewster angle is approximately 67.4 degrees. Alternatively, Brewster plate 16 may be of an enhanced type including one or more thin film coatings, such as a Thin Film Polarizer, sold by Two-Six, Inc., Saxonburg, Pennsylvania. Brewster plates are optical devices which are sensitive to the polarization of the light impingent thereon. In the present example, the light beam including the upwardly polarized vector (in the plane of incidence) passes through plate 16, while the light beam including the outwardly polarized vector (normal to the plane of incidence) reflects from surface 16a. Because it is not necessary to an understanding of the invention, the refraction of the light passing through Brewster plates 16 and 18 is not illustrated in the figures.

The light reflected by Brewster plate 16 is directed onto reflecting surface 20a of mirror 20, and from there onto reflecting surface 22a of mirror 22, where it is further reflected onto surface 18a of Brewster plate 18. Mirrors 20 and 22 are obliquely positioned with respect to the propagation direction of the light, typically such that surfaces 20a and 22a are parallel to surfaces 16a and 18a, respectively, so that the light reflected by mirror 22 onto Brewster plate 18 is coincident with the beam passing through plate 18.

Brewster plate 18 is similar to plate 16, and may include thin film coatings on surface 18a which transmit light with the upward polarization vector, while more efficiently reflecting light with the outward polarization vector. Plate 18 is positioned obliquely with respect to the two light beams incident on it, typically at the Brewster angle $\beta$ for the material of plate 18, and the light coming away from surface 18a is coaxial with the light directed onto Brewster plate 16.

Finally, the light from Brewster plate 18 passes through polarization rotator 14, which is similar to polarization rotator 12 and is responsive to the same control signal 26. As a result, the output light beam emerging from rotator 14 has the same polarization as the input beam. It should be noted that the sole function of polarization rotator 14 is to restore the original polarization vector to the light. If this function is unnecessary for the particular application of the present invention, polarization rotator 14 may be eliminated.

By way of summary, it is seen that for a first state of control signal 26, which state causes the rotation of the polarization of light passing through elements 12 and 14, light applied to time delay unit 10 traverses a first path through elements 12, 16, 18, and 14. For a second state of control signal 26, which state does not affect the polarization of light passing through elements 12 and 14, light applied to time delay unit 10 traverses a second path through element 12, reflected by elements 16, 20, 22, and 18, and through element 14. The difference in path length between the longer second path and the shorter first path is the measure of the time delay provided by unit 10. In the FIG. 2 illustration, this delay is equivalent to the sum of the lengths of paths 28a, 28b and 28c less the length of path 29.

Figure 3A:
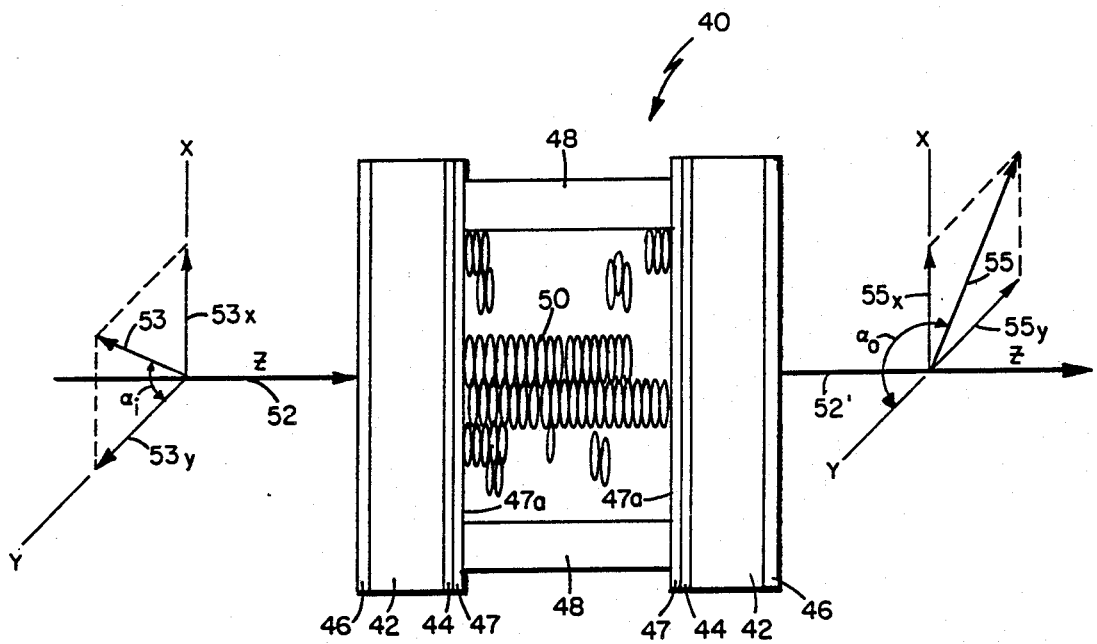
FIGS. 3A through 3E illustrate liquid crystal cells suitable for use in the FIG. 2 embodiment.
Figure 3B:
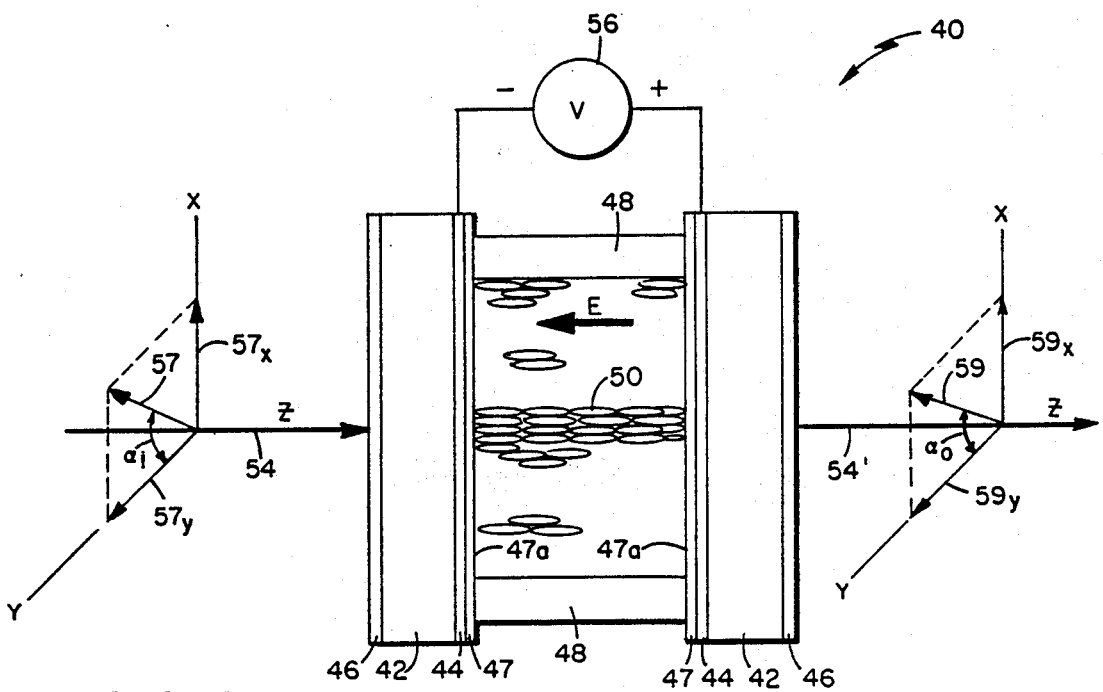

Referring to FIGS. 3A and 3B, there are shown side views of a liquid crystal electro-optic cell 40 which may be of a type used as switchable polarization rotators 12 and 14 of the FIG. 2 embodiment. Cell 40 includes cell windows 42 including electrically-conductive layers 44 and anti-reflective layers 46 and 47. Windows 42 (and their coated layers) are spaced apart by cell spacers 48.

The liquid crystal molecules 50 within cell 40 are long, thin, rod-like organic molecules of the so-called "nematic" phase.

Cell windows 42 must exhibit low absorption of the infrared light having the wavelength emitted by a $CO_2$ laser, typically at 10.6 μm. Typical candidates for the choice of cell window 42 include semiconductors such as zinc selenide, germanium and gallium arsenide, and halide salts such as potassium chloride, all of which are relatively transparent to $CO_2$ laser light. In addition, layers 44, which provide electrical conductivity across cell windows 42, must also be optically transparent at the above-mentioned wavelength.

It is known by those skilled in the art to form an optically transparent electrode by the deposition of a thin-film conductor, such as indium-tin oxide (ITO) or indium oxide ($In_2O_3$), on a surface of a plate of transparent material. Such conductive films are inherently lossy in the infrared region, that is, they absorb the infrared energy, due to their high electron concentrations and low carrier mobilities. An indium-tin oxide film a few thousand Ångstroms thick transmits approximately 80–90 percent in the visible spectrum, and 200 Ångstrom-thick film transmits approximately 50 percent at a wavelength of 10.6 μm. It has been reported that indium oxide provides 65–80 percent transmission at wavelengths between 8–12 μm with film sheet resistances of 20–50 ohms/square.

It is also known by those skilled in the art that some semiconducting materials, such as germanium, can be used as infrared transparent substrates to establish a uniform electric field across the liquid crystal cell. The absorption of infrared energy in intrinsic germanium is significantly less than in a film including indium oxide. Intrinsic germanium may typically have an absorption coefficient for infrared energy of 0.03 $cm^{-1}$; thus, a germanium cell window 2 millimeters thick would therefore absorb only 0.6 percent of the incident energy.

One shortcoming of such a transparent electrode is the difficulty in fabricating an electrode pattern, or a pattern of multiple electrodes, on a single substrate. The surface resistivity of the material allows unacceptably high leakage currents across the surface. For the case of multiple electrodes, electrical isolation may be achieved by the standard technique of using back-to-back diodes to isolate the electrodes from each other, e.g., the implantation of n-type electrodes in a p-type substrate. In this particular example, this approach is problematic for the reason that the potentials required to safely back bias the diodes would induce unwanted reactions in the liquid crystals. Furthermore, the dopants required to form the junctions would introduce additional absorption of the light energy.

Alternatively, one might deposit transparent semiconductor material on an insulating transparent substrate, such as KCl, in the required electrode pattern. Difficulties then arise when coating the substrate with an anti-reflective material, due to an almost certain optical refractive index mismatch between the semiconductor electrodes and the substrate.

In accordance with the preferred embodiment of the present invention, optically transparent electrodes are provided on cell windows 42 by a process of ion implantation. An illustrative cell window is fabricated from a small slab of optically-transparent semi-insulating crystalline material such as gallium arsenide, typically one inch (2.54 cm) in diameter and one mm thick. Such a thickness of gallium arsenide exhibits very low absorption of light energy in the infrared band of interest here. Gallium arsenide has a high resistivity, in the order of $10^7$ ohm-cm. The semi-insulating properties of the crystalline slab may be obtained by known growth techniques, for example, liquid encapsulated Czochralski (LEC), or it may be doped with chromium using known techniques. The slab is chem-mechanically polished prior to subsequent steps.

One surface of the slab is then coated with a photoresist, which may be a photosensitive polymer. In the present example, a positive photoresist, Type 1400-31, sold by the Shipley Co., Newton, Mass., is applied to the slab, followed by a heating step at 90° C. for three minutes. The coated slab is then hydrated for at least ten minutes, during which time the part cools and absorbs water vapor.

A photomask occults that portion of the coated surface which is intended to comprise the electrode, and the surface is then exposed to ultraviolet light for approximately 3.5 seconds. Following exposure, there may be a heating step at 90° C. for 20–30 minutes, followed by the development of the photoresist pattern in an alkaline solution for approximately one minute, during which step the exposed photoresist (not covered by the mask) is dissolved. The slab is then rinsed in water for approximately one minute.

The next step is the ion implantation process during which ions, typically $^{29}Si$ ions, bombard the prepared surface with an energy of 100 KeV and dosage of $5 \times 10^{13}$ $cm^{-2}$. As is well known, the bombarding ions will implant only in the regions which are not coated with photoresist. The above-mentioned dosage should provide a sheet resistivity of approximately 100–300 ohms/square following an annealing process. After implantation, the remaining photoresist is stripped in acetone followed by oxygen plasma stripping.

An annealing step, which follows the ion implantation step, electrically activates the implanted ions in order to cause conductivity. In the present example, the ion-implanted slab of semi-insulating material is ramped to a maximum temperature of 900° C. over a period of approximately two hours, and allowed to cool. The annealing process takes place in a sealed vessel containing an arsenic overpressure.

The final step in the process of producing an electrode for use on a liquid crystal cell window by ion implantation, involves a metalization step, in which metal is deposited on the slab, in electrical contact with the ion-implanted region, to produce a bonding pad for electrical connection to a source of electrical potential by, for example, ultrasonic bonding. The metalization step is accomplished using convention materials, illustratively, nickel, gold/germanium and gold, and using processes well known by those with ordinary skill in the art.

Using the above process, there is provided an optically transparent electrode on a sheet of optically-transparent, semi-insulating crystalline material using ion implantation to form the electrode. Thus, the electrode region, which may comprise less than the entire surface of the sheet of crystalline material, exhibits substantially identical transmission characteristics as the non-implanted regions of the sheet to radiant energy in the range of infrared wavelengths of interest, illustratively between 9 and 11 μmeters.

The above-described process is intended to be illustrative, and not limiting. It should be noted that germanium ions may be used for implantation. Furthermore, it will be recognized that the annealing process may not be required, as, for some semiinsulating crystalline materials and implanted ions, it may not be necessary to anneal as damage caused by bombardment of the slab by the implanted ions may be sufficient to cause conductivity.

Whereas, the application described herein for the present invention requires only single electrodes on each cell window, it is easily seen that the above-described process is applicable to any number of electrodes and patterns. Complex electrode geometries may be formed with feature resolution limited only by state-of-the-art semiconductor lithography.

In most cases, it is only necessary to provide an ion-implanted electrode on one of the cell windows, and the remaining cell window may comprise a conductive material, such as intrinsic germanium. An ion-implanted electrode pattern on one cell window is typically sufficient to establish the proper electric field between the two cell windows.

Anti-reflective layers 46 and 47 reduce the reflections when light passes from one optically-transmissive medium to another. Single layer and multiple layer anti-reflective coatings are well known in the art and are used to effectively eliminate reflections. Ideally, a single layer anti-reflective coating comprises a material whose refractive index is the geometric mean of the refractive indices of the two media. By way of example, the anti-reflective layers 46 at the outer surfaces of germanium (n=4.0) cell windows 42 may comprise by way of example, the anti-reflective layers 47 at the inner surfaces of cell windows 42 may comprise zinc selenide (n=2.4), to match to the liquid crystal film (n=1.7). In some instances, as with the halide windows, the refractive indices of windows 42 and liquid crystal molecules 50 may be sufficiently close that anti-reflective layers 47 are not necessary.

The organic molecules of the liquid crystal nematic phase exhibit long range molecular order in the liquid state. This ordered orientation is illustrated by the molecules 50 of the cell 40 of both FIGS. 3A and 3B. In FIG. 3A, light beam 52 propagates along the z-axis transverse to the long molecular axes of molecules 50, and in FIG. 3B, light beam 54 propagates along the longitudinal direction of the long molecular axes.

The long range molecular ordering in conjunction with their rod-like shape gives rise to anisotropic optical properties. Light propagating along the long longitudinal direction of the molecular axes, as in FIG. 3B, sees an index $n_o$, the so called ordinary index, irrespective of the polarization. Light propagating transverse to the long molecular axes, as in FIG. 3A, also sees index $n_o$ if the polarization is normal to the long molecular axes; however, it sees index $n_e$, the extraordinary index, if the polarization is along the long molecular axes. For intermediate polarizations, the effective index is intermediate to $n_o$ and $n_e$.

The difference between $n_e$ and $n_o$ is called birefringence, $\Delta = n_e - n_o$. Light of wavelength $\lambda$ propagating through a thin layer of liquid crystal of thickness t undergoes a phase shift given by $\phi = (2\pi/\lambda)nt$, where n is the appropriate index for the particular polarization and propagation direction. The difference in phase shifts for ordinary and extraordinary polarized light propagating through an aligned liquid crystal layer is thus $\delta\phi = (2\pi/\lambda)nt$. The quantity $\delta\phi$ is often referred to as the retardance.

It is seen that this type of liquid crystal acts as an optical retarder, or wave plate, having retardance $\delta\phi$. The "fast axis" of the retarder; i.e. the polarization orientation having the lower refractive index and therefore the fastest wave velocity, is determined by the direction of orientation of the liquid crystal molecules. For many nematic liquid crystals, $n_e$ is greater than $n_o$, and the fast axis is orthogonal to the molecular orientation axis. If the cell thickness and birefringence is chosen such that $\delta\phi = (2i+1)\pi$, where i is any integer, the cell is a half-wave plate and can be used to rotate the plane of polarization of linearly polarized light. Cells 12 and 14 of FIG. 2 may be chosen with this configuration to function as polarization rotators.

Referring again to FIGS. 3A and 3B, in order to exhibit the desired birefringence in bulk devices, the liquid crystals must be properly and uniformly aligned. This is usually done by special treatment of the innermost surfaces 47a of the coatings on cell windows 42. If the innermost surfaces 47a of the coatings on windows 42 have been "prepared" or striolated by, for example, rubbing unidirectionally with fine grinding powder to produce extremely fine, parallel striolae, the liquid crystal molecules 50 adjacent to the innermost surfaces 47a will tend to align themselves along and in these minute grooves and thereby be preferentially aligned. If cell 40 is thin, as is the usual case, and if the grooves on the innermost surfaces 47a of the coatings on windows 42 are parallel, as in this example, this positional orientation is transferred across the cell by the natural tendencies of the molecules 50 to align parallel to one another. Typical depths of the striolae are only a few Ångstrom units, to match the effective diameters of the liquid crystal molecules 50. An alternate means of preparing surfaces 47a is ion beam deposition of dielectrics at a near grazing angle to produce small parallel ripples in surface 47a. This shallow angle deposition technique is currently the preferred technique. With either method, the striolae are so much smaller than a wavelength that they contribute negligible scatter, even in the visible spectrum; therefore, scatter in the infrared is quite insignificant.

Application of an electric field to the molecules 50 of the liquid crystal induces an electric dipole moment, and the molecules 50 tend to re-align with the field, either parallel or perpendicular, depending on the internal structure of the liquid crystal molecules 50. If a surface of each of the cell windows 42 is coated with a transparent, electrically-conducting material 44 and a voltage from a source 56 is applied across the cell 40, the molecules 50 tend to align perpendicular to the cell faces 42 for the nematic liquid crystals of the present example. This destroys the orientational anisotropy imparted by the preparation of surfaces 47a. The molecules 50 are instead aligned along the direction of propagation and no refractive index difference is seen for x and y polarizations; the retardance is thereby switched off. Application of a few volts across a 50 $\mu$m thick cell is typically sufficient to reduce the retardance from its nominal value to zero. When the voltage from source 56 is removed, visco-elastic forces in the liquid tend to realign the molecules 50 with the surface structure 47a and the birefringence is restored. The optical properties are very repeatable with voltage cycling. Typical full-cycle switching times range from a few to many milliseconds, depending on the liquid crystal material and the cell geometry.

The polarization vectors of the input and output light beams of the examples of FIGS. 3A and 3B illustrate the polarization rotation of liquid crystal cell 40. In the example of FIG. 3A, input light beam 52 propagates along the z-axis and has a transverse polarization vector 53. Vector 53 is selected such that angle $\alpha_i$ is 45 degrees; therefore, the x-axis vector component $53_x$ and the y-axis vector component $53_y$ are equal.

In the absence of an electric field between cell windows 42, molecules 50 tend to be preferentially aligned, causing the x-axis to be the slow axis, and the y-axis to be the fast axis. Thus, a preselected wavelength of light beam 52 and a preselected thickness of cell 40 (the length of spacers 48), will result in the x component of the output vector $55_x$ being equal to the x component of the input vector $53_x$. And, for the same thickness of cell 40, the y component of the output vector $55_y$ will be equal to but 180 degrees out of phase with the y component of the input vector $53_y$. Since the output x component $55_x$ and output y component $55_y$ are equal in magnitude, it is easily seen that the composite output vector 55 has an angle $\alpha_o$ of 135 degrees and is equal in magnitude to the composite input vector 53. Thus, in the half-wave plate of this example, for which the transverse polarization 53 of the input beam 52 is 45 degrees off the preferential alignment of molecules 50, the transverse polarization 55 of output light beam 52' is rotated by 90 degrees with respect to the transverse polarization 53 of input beam 52 by the action of liquid crystal cell 40 in the absence of any electric field across molecules 50. A typical cell thickness of such a half-wave plate may be 26 $\mu$m for operation in the infrared region for a typical liquid crystal formulation such as BHD E7, sold by British Drug House.

Referring to FIG. 3B, voltage source 56 couples a potential between electrically-conductive coatings 44, resulting in an electric field E between cell windows 42, causing molecules 50 to be aligned in the direction of the field E as shown. As was described earlier, in this configuration of molecules 50 there is no retardance. Thus, for an input beam 54 having transverse polarization vector 57 (including x component $57_x$ equal to y component $57_y$), the same preselected wavelength of light beam 54 and the same preselected thickness of cell 40 will result in an output light beam 54' having polarization vector 59 (including x component $59_x$ and y component $59_y$) which is equal in magnitude and polarization orientation to the input beam 54. Thus, in this example, the transverse polarization 59 of output light beam 54' is unaffected with respect to the transverse polarization 57 of input light beam 54 by the action of liquid crystal cell 40 in the presence of an electric field E causing alignment of the molecules 50 along the direction of propagation of light beam 54.

In summary, considering FIG. 2 in view of FIGS. 3A and 3B, it can be said that for a polarization control signal 26 from circuit 24 which results in no electric field across the molecules of cell 12 (and cell 14), the polarization of input light beam 11 is rotated 90 degrees by cell 12, and the resulting light beam is transmitted through Brewster plates 16 and 18 to cell 14, where the polarization is further rotated to its original state. For a control signal 26 which causes an electric field across the molecules of cell 12 (and cell 14), the polarization of input light beam 11 is unaffected by cell 12, and the resulting light beam is reflected by Brewster plates 16 and 18 to cell 14, through which the light passes again without affecting its polarization.

In addition to the above-described nematic liquid crystals, in which $n_e > n_o$, whose alignment is referred to as "homogeneous," other nematic liquid crystals, in which $n_e < n_o$, align perpendicular to the applied electric field, and whose alignment is referred to as "homeotropic." One may prepare the surfaces of the cell windows for a homeotropic orientation by establishing a preferential alignment perpendicular to the surfaces; an applied field then orients the crystals parallel to the surfaces. The polarization rotation through the homeotropically-oriented crystals is easily seen to be analagous to the polarization rotation through the homogeneous alignment.

Figure 3C:
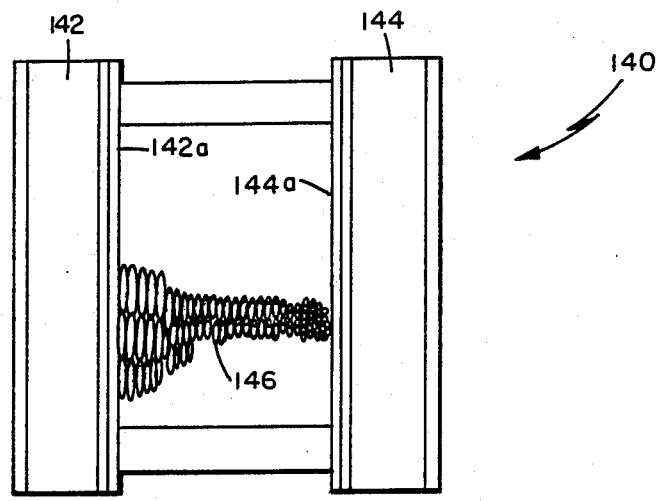

Another form of liquid crystal cell suitable for use in the optical delay unit of the present invention is illustrated in FIG. 3C. This cell is the familiar-twisted nematic liquid crystal cell which is widely used in liquid crystal displays. In this configuration, the alignment striolae on the inner structure 142a of cell window 142 are perpendicular to the alignment striolae on the inner surface 144a of cell window 144.

Figures 3D, 3E:
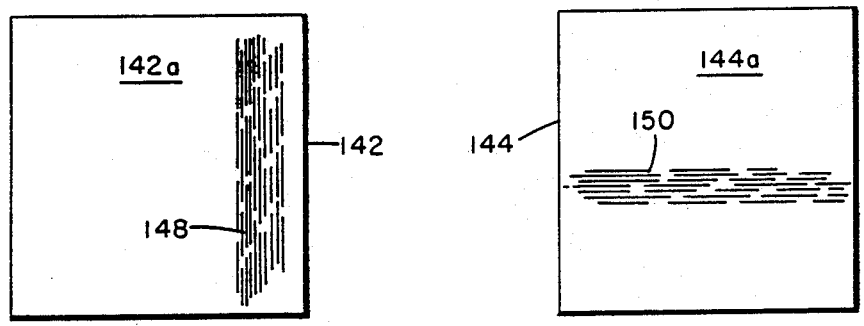

In the FIG. 3C embodiment, attention is drawn to FIGS. 3D and 3E which present front views of surfaces 142a and 144a, respectively. In FIG. 3D, vertical alignment striolae 148 are shown in surface 142a of cell window 142, and FIG. 3E illustrates horizontal alignment striolae 150 on surface 144a of cell window 144.

The effect of this "twisted" orientation of alignment grooves is to cause the molecules 146 of cell 140 in FIG. 3C to be aligned as shown. The molecules 146 adjacent surface 142a are vertically aligned, and the molecules 146 adjacent surface 144a are horizontally aligned (normal to the plane of the drawing sheet). The intermediate molecules 146 assume uniformly intermediate orientations between the two extreme orientations. It is well known that the polarization direction of light polarized in any direction transverse to its propagation direction will follow the gradual twist of the liquid crystal molecules and therefore have its polarization rotated by 90 degrees by a twisted nematic liquid crystal cell 140 of the type shown in FIG. 3C.

Cell 140 of FIG. 3C responds to a voltage potential between its cell windows 142 and 144 in identical manner as cell 40 of FIG. 3A. That is, in the presence of an electric field between the windows, molecules 146 of the FIG. 3C embodiment align themselves precisely as molecules 50 of FIG. 3B. It is therefore easily seen that in the presence of a voltage potential between windows 142 and 144, light polarized in a direction transverse to the direction of propagation will undergo no polarization change while propagating through cell 140. By way of summary, it has been shown that for no electric potential between cell windows 142 and 144, the transverse polarization of light is rotated by 90 degrees in cell 140, but that for an electric potential between cell windows 142 and 144, no polarization rotation occurs. Thus, it is seen that cell 140 acts as a switchable polarization rotator, and is therefore suitable for use as elements 12 and 14 of the FIG. 1 embodiment.

One shortcoming of the basic embodiment of time delay unit 10 illustrated schematically in FIG. 2 is the inability to adjust the differential delay between the two path lengths to near zero. It is easily seen that for a finite beam width, there is a lower bound to the length of paths 28a and 28c such that the beams will be diverted clear of Brewster plates 16 and 18. A preferred embodiment, shown as time delay unit 60, is schematically illustrated in FIG. 4.

Time delay unit 60 uses identical elements as time delay unit 10 of FIG. 2, but with the addition of elements for providing adjustments of the optical length of the transmissive paths through Brewster plates 16 and 18. The elements of FIG. 4 which are of a type described in FIG. 2 are given identical designation numerals.

Figure 4:
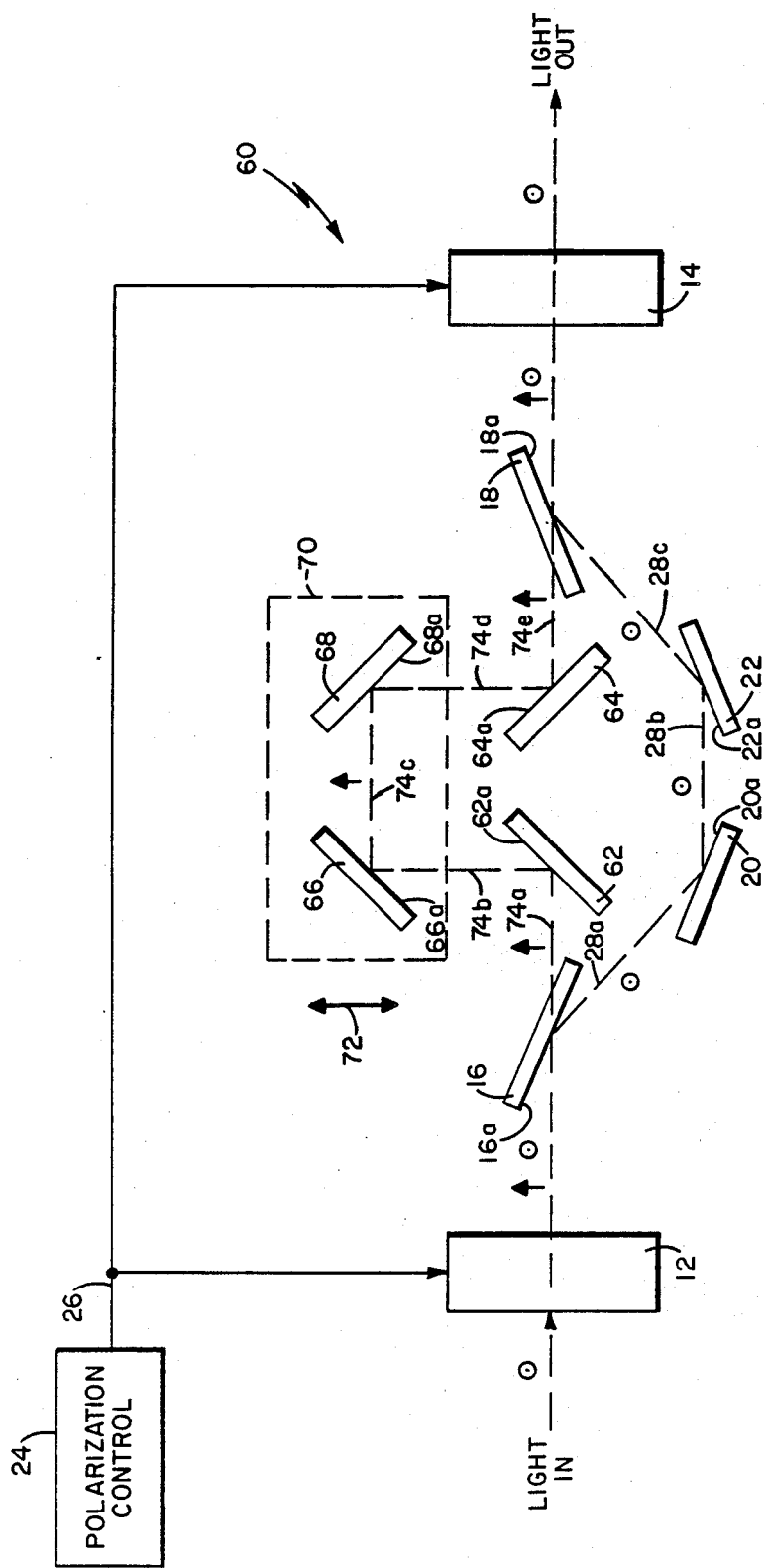
FIG. 4 is a simplified block diagram of a second embodiment of the present invention.

Referring to FIG. 4, there is shown, interposed in the optical path having polarization including an upward vector between Brewster plates 16 and 18, two mirrors 62 and 64, which are fixed in position, and two mirrors 66 and 68, which are mounted on translation stage 70, which is adjustable in the directions indicated by arrow 72. Light passing through Brewster plate 16 is reflected from reflecting surface 62a of mirror 62, onto reflecting surface 66a of mirror 66, onto reflecting surface 68a of mirror 68, and finally onto reflecting surface 64a of mirror 64. The beam reflected from surface 64a into Brewster plate 18 is coaxial with the beam emerging from Brewster plate 16.

In this embodiment, the differential delay between the two paths is equal to the difference between the sum of paths 28a, 28b and 28c and the sum of paths 74a, 74b, 74c, 74d and 74e. Thus, it is easily seen that positional adjustments of translation stage 70 along the directions of arrow 72 provide a range of differential path length delays, both positive and negative, also including zero.

Figure 5:
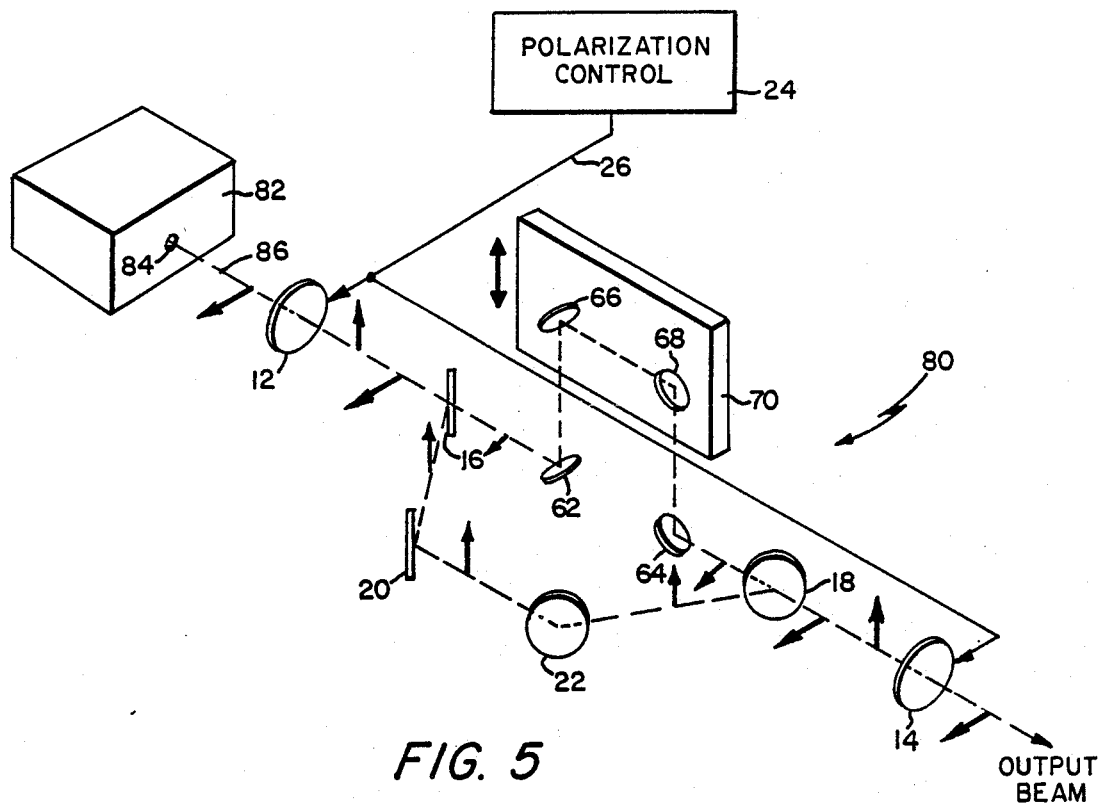
FIG. 5 illustrates the FIG. 4 embodiment as it may be configured for use in an optical phased array.
Figure 7:
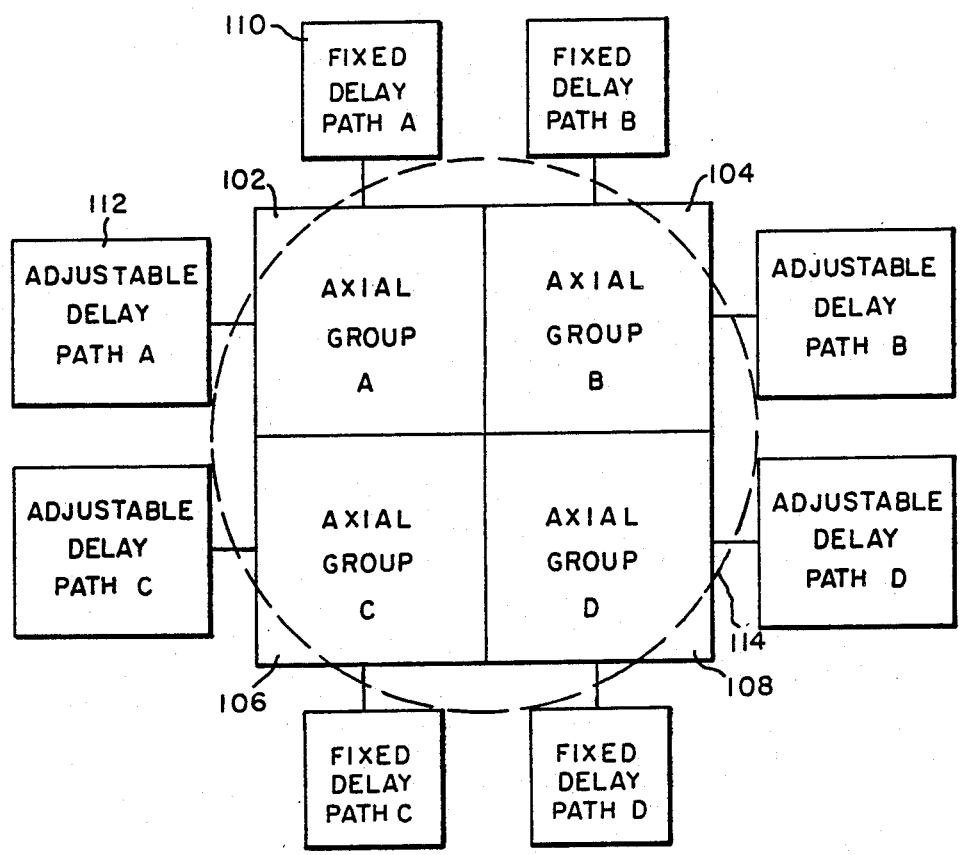
FIG. 7 is a simplified block diagram showing an end-view arrangement of the elements of the FIG. 4 embodiment in a 2×2 array.

Referring to FIG. 5, there is shown a particular configuration of the elements of the FIG. 4 embodiment which is well-suited for use in a beam-forming array as, for example, in the array depicted in FIG. 7. The FIG. 5 configuration includes $CO_2$ laser 82 having aperture 84 emitting light beam 86. FIG. 5 additionally depicts switchable polarization rotators 12 and 14, Brewster plates 16 and 18, mirrors 20, 22 and 62–68, translation stage 70, and polarization control circuit 24 generating control signal 26. These elements are of a type similar to those with like designation numerals described in relation to earlier figures. Arrows, representing polarization vectors, are shown periodically along the light beam.

In the FIG. 5 configuration, mirror 62 is angled such that it reflects light in a different plane from the light reflected by elements 16, 20, 22, and 18. Furthermore, mirror 64 is angled such that the light reflected from mirror 68 is returned to the plane of the other path. In FIG. 5, the planes of the two delay paths are shown as being orthogonal, but this is not a necessary limitation on the invention.

Figure 6:
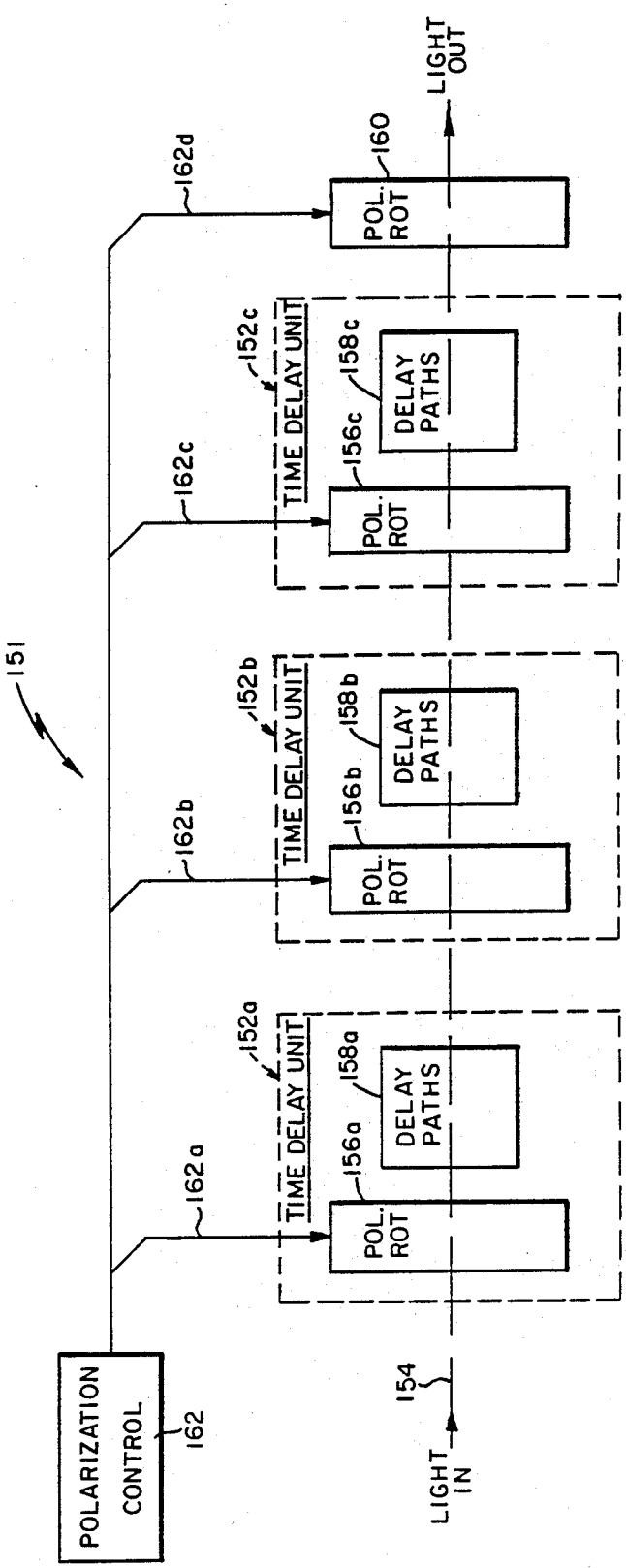
FIG. 6 illustrates a plurality of the optical time delay apparatus in a cascade configuration.

FIG. 6 illustrates a cascade configuration of optical time delay units which provides selection of a multiplicity of delay times. Apparatus 151 comprises a plurality (three are illustrated) of time delay units 152a, b and c, which are aligned with incoming light beam 154. Time delay units 152a, embodiment.

Typical time delay unit 152a includes polarization and delay path optical device 158a, which may comprise optical elements similar to elements 16, 18, 20 and 22 of the FIG. 2 embodiment. The time delay unit 10 of FIG. 2 includes a polarization rotator 14 for restoring the original polarization vector to the output of light beam; however, in the cascade configuration of FIG. 6, only a single resetting polarization rotator 160 is required, positioned after the final stage 152c.

Polarization control circuit 162 provides a plurality of control signals 162a, b, c and d, respectively, to polarization rotators 156a, b, c and 160 to establish the total optical path length through cascaded time delay apparatus 151. Using appropriate applications of control signals 162a, b and c to time delay units 152a, b and c, any one of typically $2^n$ different delays may be established through apparatus 151, where n is the number of time delay units. Since the individual time delay units 152a, b and c of the FIG. 6 embodiment do not each include resetting polarization rotators, the functions provided by control signals 162b, c and d depend on the states of the control signals going before, and the state of control signal 162d must be a function of the parity of signals 162a, b and c.

FIG. 7 is a simplified representation of a configuration including four time delay units 80 of the preferred embodiment of FIG. 5. FIG. 7 represents an optical beam steering system arranged in a 2-by-2 array. The element designated as axial group A 102 includes all optical elements of a time delay unit which are coaxial with the source and output beam, namely, switchable polarization rotators 12 and 14, Brewster plates 16 and 18, and mirrors 62 and 64, as shown in FIG. 5. The element designated as fixed delay path A 110, in FIG. 7, includes mirrors 20 and 22 of the FIG. 5 embodiment. Finally, the element designated as adjustable delay path A 112, in FIG. 7, includes mirrors 66 and 68 mounted on translation stage 70, as shown in the embodiment of FIG. 5.

Similarly, the B, C, and D axial groups 104–108 and delay paths of FIG. 7 comprise the corresponding optical elements of three other time delay units 80 as shown in FIG. 5. In order that the arrangement of FIG. 7 functions as a beam steering system, light from a source, typically a $CO_2$ is directed along an axis normal to the sheet of FIG. 7 so as to illuminate elements 102–108, each of these elements being illuminated by a distinct sector of the cross-sectional area 114 of the beam. After passing through the elements comprising the axial groups, as well as the corresponding fixed and/or adjustable delay paths, the beam sectors are directed individually to subarrays of phase shifters of the type shown in the FIG. 1 steerer as subarrays 34. By the appropriate selection of the polarization control signals associated with the four axial groups 102–108, the composite output beam from subarrays 34 (as in FIG. 1) may be directed upward, downward, left, right or normal to the sheet.

Figure 8A:
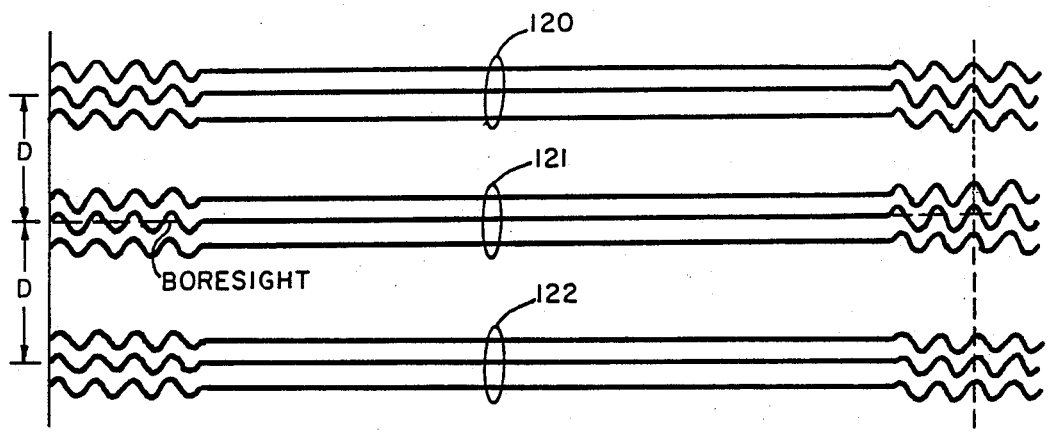
FIGS. 8A through 8C are timing charts demonstrating the beam steering capability of a phased array.
Figure 8B:
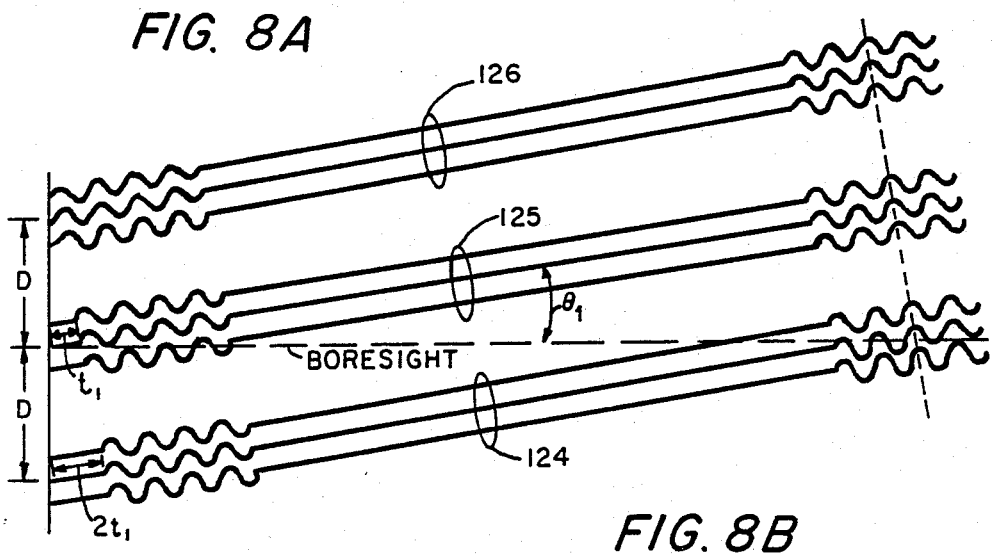
Figure 8C:
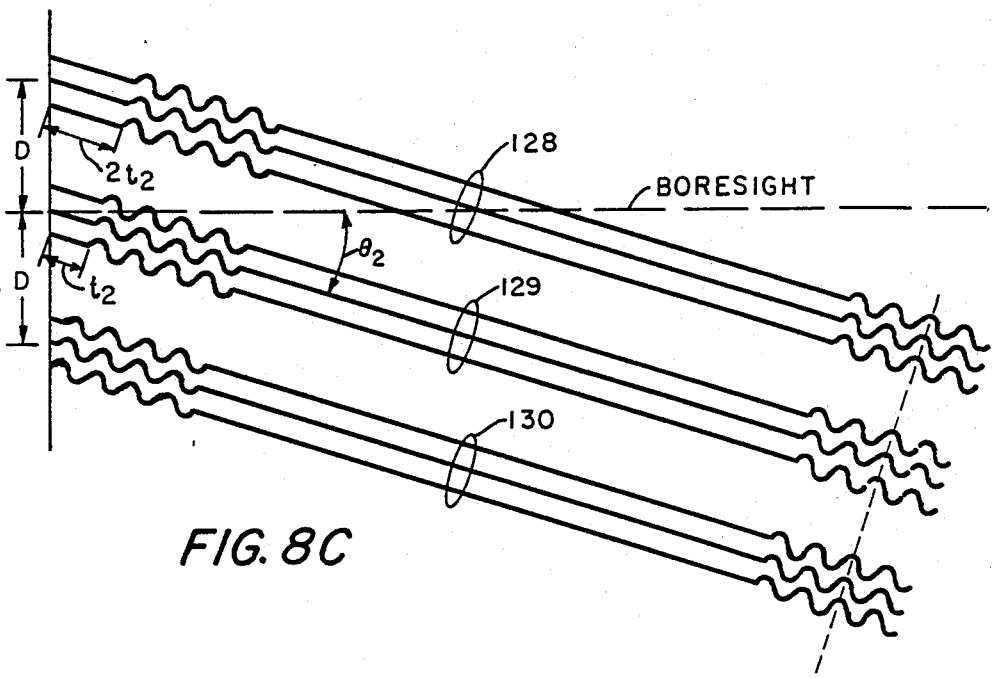

FIGS. 8A through 8C illustrate a simplified example of beamsteering using a one-dimensional array of three subarrays, in which each subarray comprises three phase shifters. In each of the FIGS. 8A, 8B and 8C, the phase shifters (not shown) of each subarray may provide selective phase shifting between 0 and $2\pi$ radians. Each subarray is fed by a time delay unit (not shown) which provides a selectable delay to the beam. In FIGS. 8A, 8B and 8C, pulses of light are emitted from three coherent sources having beam centers spaced apart by dimension D. In FIG. 8A, the three subarray beams 120, 121 and 122 are generated simultaneously, and the wavefronts from each burst will arrive simultaneously at a target which is perpendicular to the surface of the array, or directly on boresight.

In FIG. 8B, the bursts of beams 125 are delayed $t_1$ seconds with respect to the corresponding bursts of beams 124, and the bursts of beams 126 are delayed an additional $t_1$ seconds from the bursts of beams 125. In this case, the wavefronts from each burst will simultaneously arrive at a target which is located at an angle $\theta_1 = \sin^{-1}(ct_1/D)$ above boresight, where c is the velocity of light in units compatible with $t_1$ and D.

Similarly, FIG. 8C shows the bursts of beams 129 delayed $t_2$ seconds with respect to the corresponding bursts of beams 128, and the bursts of beams 130 delayed an additional $t_2$ seconds from the bursts of beams 129. In this case, the wavefronts from each burst will simultaneously arrive at a target which is located at an angle $\theta_2 = \sin^{-1}(ct_2/D)$ below boresight.

Considering a numerical example, if it is desired to aim a composite beam 10 degrees off boresight, and the centers of the subarray elements are spaced apart by ten centimeters, then the appropriate beam may be formed by delaying the bursts of one by $t = D \sin \theta/c \times 0.06$ nanoseconds relative to the other. This corresponds to a differential path length difference of about 0.7 inches (1.7 cm).

While the principles of the present invention have been demonstrated with particular regard to the illustrated structure of the figures, it will be recognized that various departures from such illustrative structure may be undertaken in the practice of the invention. As an example, it is considered well within the ability of one having ordinary skill in the art to vary the angle between the planes of the two optical paths in the FIG. 5 embodiment to allow varying configurations in an array, one example of which is shown in FIG. 7, and to allow for arrays much larger than 2-by-2 elements. Furthermore, it is considered to be within ordinary skill to arrange optical devices so as to divide beam 114 (as in FIG. 7), illustratively by reflection or refraction, into a plurality of sub-beams, to provide selectable delays to each sub-beam using the principles taught herein, and to direct the sub-beams for application to a respective plurality of subarrays. The scope of this invention is therefore not intended to be limited to the structure disclosed herein but should instead be gauged by the breadth of the claims which follow.

What is claimed is:

1. An optically transparent electrode comprising
a sheet of optically-transparent, semi-insulating crystalline material, said sheet having a region on a surface of said sheet implanted with ions, said ion-implanted region comprising less than the entire area of said surface of said sheet, said sheet having been annealed following ion implantation to electrically activate said implanted ions, wherein said sheet exhibits uniform transmission characteristics over said surface to radiant energy of a predetermined wavelength.

2. The electrode according to claim 1 wherein said predetermined wavelength corresponds to a frequency in the infrared band.

3. The electrode according to claim 1 wherein said crystalline material comprises gallium arsenide, and said implanted ions comprise ions of silicon.

* * * * *